(12) United States Patent
McGrath

(10) Patent No.: US 6,416,665 B1
(45) Date of Patent: Jul. 9, 2002

(54) FILTRATION APPARATUS

(76) Inventor: Kevin Douglas McGrath, PO Box 1092, Ingham Queensland 4850 (AU)

( * ) Notice: Subject to any disclaimer, the term of this patent is extended or adjusted under 35 U.S.C. 154(b) by 0 days.

(21) Appl. No.: 09/581,347

(22) PCT Filed: Dec. 9, 1997

(86) PCT No.: PCT/AU98/01017
§ 371 (c)(1),
(2), (4) Date: Aug. 22, 2000

(87) PCT Pub. No.: WO99/29393
PCT Pub. Date: Jun. 17, 1999

(30) Foreign Application Priority Data

Dec. 9, 1997 (AU) .............................................. PP0813

(51) Int. Cl.[7] ........................ B01D 33/06; B01D 33/073
(52) U.S. Cl. .......................... 210/321.67; 210/321.68; 210/321.69; 210/391; 210/407; 210/433.1
(58) Field of Search ..................... 210/321.67, 321.68, 210/321.69, 373, 391, 407, 416.1, 433.1

(56) References Cited

U.S. PATENT DOCUMENTS

| | | | |
|---|---|---|---|
| 3,821,108 A | 6/1974 | Manjikian | 210/433 |
| 4,083,778 A | 4/1978 | McGrew | 210/DIG. 5 |
| 4,166,034 A | 8/1979 | Bodine | 210/384 |
| 4,521,315 A | 6/1985 | Laakso | 210/784 |
| 4,729,837 A | 3/1988 | Henricson | 210/784 |
| 4,755,300 A | 7/1988 | Fischel et al. | 210/321.68 |
| 4,876,013 A | 10/1989 | Shmidt et al. | 210/321.68 |
| 4,954,268 A | 9/1990 | Just et al. | 210/772 |
| 5,073,262 A | 12/1991 | Ahlberg et al. | 210/321.68 |
| 5,250,198 A | 10/1993 | Stedfeldt | 210/797 |
| 5,409,618 A | 4/1995 | Price | 210/784 |
| 5,415,781 A | 5/1995 | Randhahn et al. | 210/650 |
| 5,421,997 A | 6/1995 | Gerteis | 210/90 |
| 5,468,844 A | 11/1995 | Smith | 210/780 |
| 5,618,423 A | 4/1997 | Lin | 210/370 |
| 5,628,909 A | 5/1997 | Bellhouse | 210/650 |
| 5,670,043 A | 9/1997 | Lee | 210/326 |
| 5,690,829 A | 11/1997 | Lauer | 210/636 |

FOREIGN PATENT DOCUMENTS

| | | |
|---|---|---|
| DE | 4015187 A1 | 11/1990 |
| WO | WO 97/05938 | 2/1990 |
| WO | WO 91/16961 | 11/1991 |

*Primary Examiner*—John Kim
(74) *Attorney, Agent, or Firm*—Cantor Colburn LLP

(57) ABSTRACT

A filtration apparatus in which a rotating filter element is concentrically mounted in a hollow conical of cylindrical chamber. The filter element consists of a support and a membrane mounted on the support. Fluid enters the chamber through an inlet port and concentrate leaves the chamber through an outlet port. Filtrate drains through the membrane and support to a channel in the centre of the filter element. Filtration relies upon cross-flow of the fluid across the surface of the rotating filter element. This reduces the tendency of solids in the fluid to block pores of the membrane, thereby maintaining high flux and minimising the requirement for cleaning of the filter.

15 Claims, 10 Drawing Sheets

FILTRATION APPARATUS

FIELD OF THE INVENTION

This invention relates to apparatus for separating solid particles from liquids.

BACKGROUND TO THE INVENTION

Separation of solids from liquids is a problem faced in a diverse range of processing situations. In the past it has been known to discharge unprocessed or partly processed liquid waste into local waterways. This has led to devastating pollution and the death of many waterways in industrialised countries. In recent years there has been increased focus on attempts to develop adequate filtration systems that can separate harmful solids from waste liquids.

The removal of phosphates and suspended solids from sewerage waste water is one example of a situation requiring improved filtration. Another problem requiring attention is the separation of particles from car wash discharge water.

It is known to use porous membranes for filtration purposes. The liquid containing solid particles passes through the membrane and the particles are trapped by the pores. A wide variety of membrane types are available on the market. They vary by material as well as by pore size. Membranes may be woven or non-woven metallic thread, ceramic, plastic, cloth or a hybrid of two or more materials. Whatever the membrane material, the operation of the membrane can be characterised by a number of parameters, including construction, performance (eg cross-flow or in-depth filtration), pore size and porosity.

For efficient operation, the pore size of the membrane filter must be less than the size of the smallest particles in the liquid. If this criteria is met the liquid will flow through the membrane but the particles will be captured. This leads to the main disadvantage of this type of filter, namely clogging of the pores. After a period of time the trapped solids will block the pores of the membrane and prevent or restrict the flow of liquid. This is particularly a problem for membranes having small pore size of, say, less than 5 $\mu$m.

Once the flow of liquid through the filter is reduced below acceptable levels it is necessary to clean the filter. Typically this is achieved by back flushing to wash the blocking material from the pores. Obviously, normal filtration operations must be suspended during the cleaning operation. The disruption is minimised if the back flushing is a simple reversal of the filtration operation but more often back flushing involves a different process. Many back flush operations require steam or compressed air to be directed back through the filter. This leads to a complex system for performing all the required operations.

Even with a sophisticated system it is often the case that back flushing will not return the filter to the same flow rates achieved with a clean filter. Repeated back flushing degrades the filtration membrane which must be replaced regularly.

One example of a filtration application having stringent requirements is the separation of blood plasma from whole blood. An apparatus for this application is described in U.S. Pat. No. 4,755,300 assigned to Haemonetics Corporation. This patent describes an apparatus in which an elongated core element is rotated within an elongate hollow container. A membrane is disposed over the exterior surface of the core element or interior surface of the container. Rotation of the core element in the container produces laminar flow of the blood in the gap between the core element and the container. The resultant shearing action produces a laminar boundary layer immediately adjacent the membrane that consists of plasma only while the suspended red blood cells are repelled towards the centre of the gap. This allows the plasma to be collected.

The requirement for laminar flow in the Haemonetics Corporation device places severe limits on its usefulness. While useful for separating plasma from blood, the apparatus does not have broader application.

One apparatus for overcoming some of the deficiencies of prior art filtration systems is described in Australian Patent Application number 50399/96 in the name of Kevin Douglas McGrath. In the McGrath filtration apparatus feed liquid flows across a membrane from an inlet port to an outlet port. Filtrate is drawn through the membrane to a filtrate outlet port. Because the feed liquid flows across the surface of the membrane the amount of material trapped permanently in the pores of the membrane is reduced.

The inventor has found that an apparatus having a greater filtrate specific flow rate than the above apparatus is desirable. Furthermore, some degree of back flushing is still required in the prior art system. It is desirable to minimise or eliminate the need for back flushing.

OBJECT OF THE INVENTION

It is an object of the present invention to provide a filtration apparatus having a relatively higher specific flow rate compared to the known prior art apparatus.

It is a further object of the invention to provide a useful alternative to known filtration apparatus.

Further objects will be evident from the following description.

DISCLOSURE OF THE INVENTION

In one form, although it need not be the only or indeed the broadest form, the invention resides in a filtration apparatus comprising:

a hollow body defining a chamber;

a filter element concentrically housed in the chamber, said filter element consisting of a support and a membrane attached to said support, and having a cross flow side and a filtrate side;

a drive mechanism coupled to said filter element and causing rotation thereof;

at least one inlet port communicating with the chamber for ingress of suspension to be filtered and at least one outlet port communicating with the chamber for egress of concentrate;

a flow path from the inlet port across the cross flow side of the filter element to the outlet port such that filtrate from the suspension passes through the filter element to the filtrate side and remaining concentrate passes out the outlet port; and a filtrate port communicating with the filtrate side of the filter element for removal of filtrate from the apparatus.

In preference, the support may be conical, cylindrical or a combination of both. The support has a plurality of apertures that allow passage of filtrate from the membrane to a channel leading to the filtrate outlet port.

The membrane is suitably formed as a composite structure having a number of layers. In the preferred structure the pore size of each layer increases from the inlet cross flow side of the membrane to the outlet filtrate side.

In preference, there are multiple inlet ports and multiple outlet ports.

A suitable drive mechanism consists of a spindle on which the cylindrical support is mounted, a motor and a coupling between the motor and the spindle. The coupling may conveniently be a belt and pulley system.

For collection of the filtrate there may be a central channel formed along a portion of the axis of the spindle. The apertures in the cylindrical support communicate with an upper end of the channel and the filtrate port communicates with a lower end. A rotary coupling may be used between the filtrate port and the channel.

The flow path preferably promotes turbulent flow in the chamber. To further promote turbulent flow the filtration apparatus may further comprise a plurality of vanes projecting into the chamber from the hollow body. The vanes are most suitably elongate projections aligned parallel to an axis of the cylindrical support.

The filtration apparatus may further comprise cleaning means for enhancing cleaning of the membrane by a pulse pressure drop in the chamber that causes an instantaneous reverse flow through the membrane. The cleaning means may comprises a pneumatic vibrator in pressure communication with the chamber for applying the reduced pressure pulse to the chamber. The pneumatic vibrator may optionally vibrate to vary the pressure drop during the reverse flow thereby enhancing the cleaning.

BRIEF DETAILS OF THE DRAWINGS

To assist in understanding the invention preferred embodiments will now be described with reference to the following figures in which.

Figure 12:
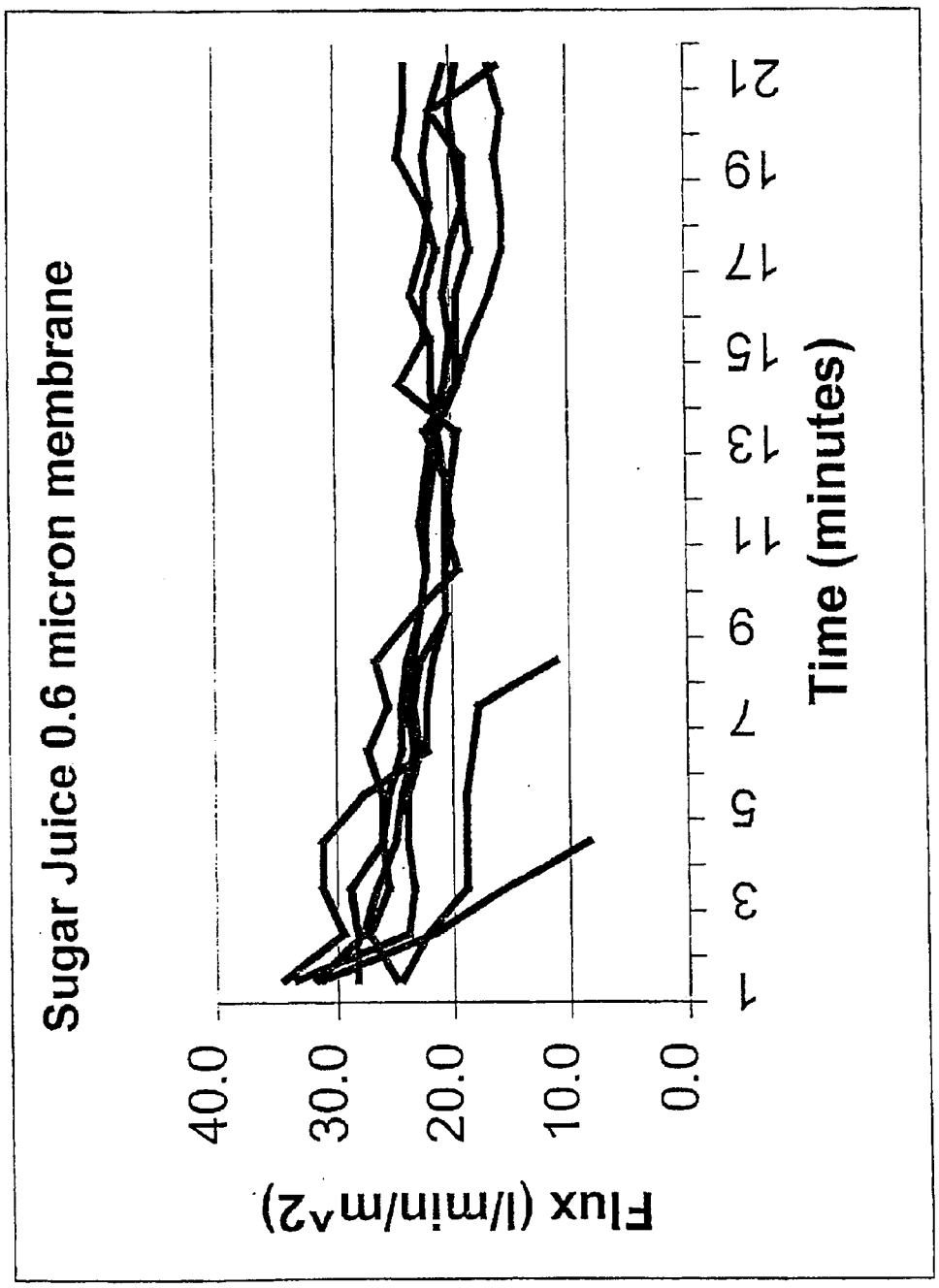

FIG. 12 demonstrates a flux profile of the first embodiment.

DETAILED DESCRIPTION OF THE DRAWINGS

Figure 1:
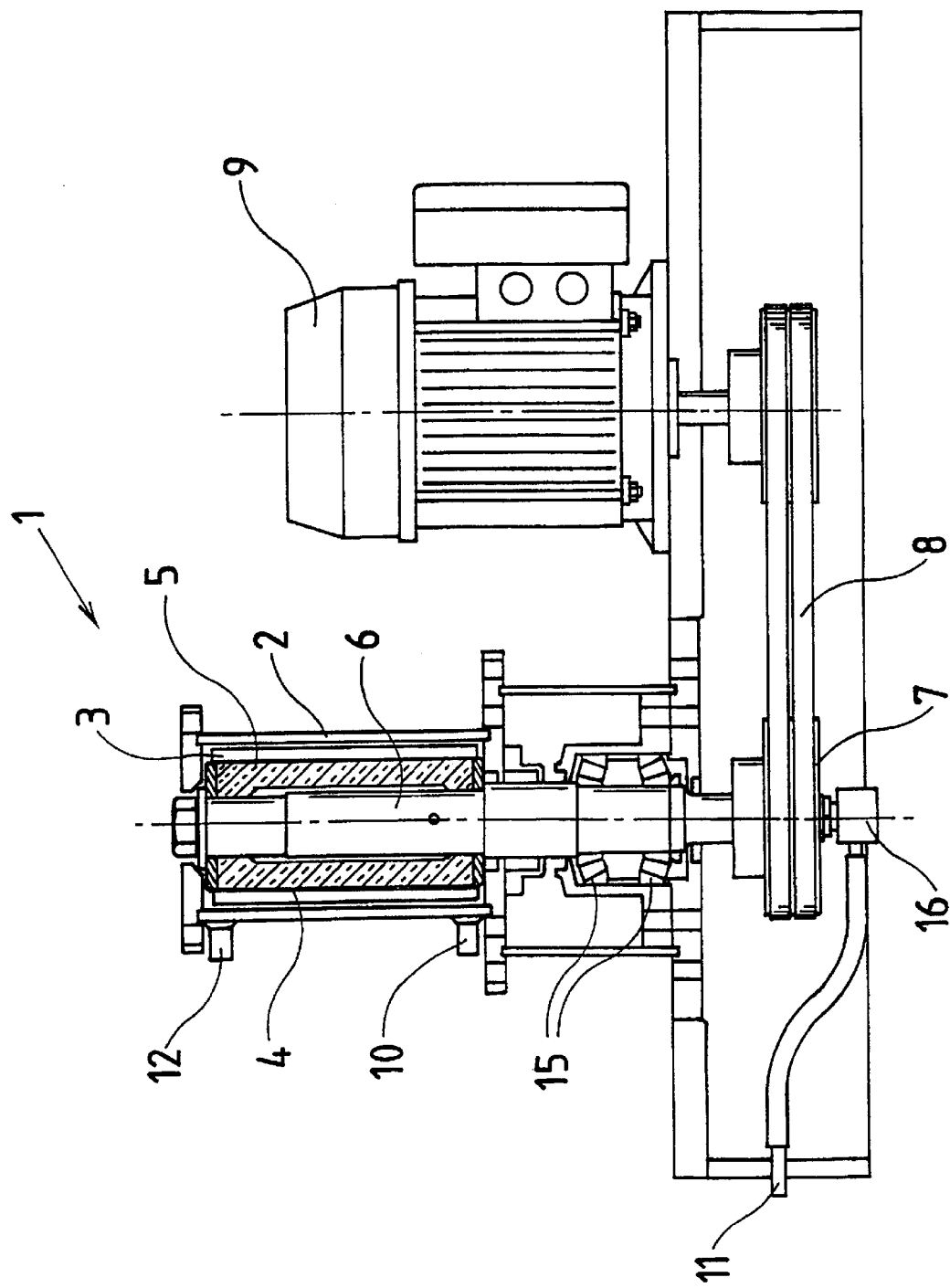
FIG. 1 is a sketch of a first embodiment of a filtration apparatus.
Figure 2:
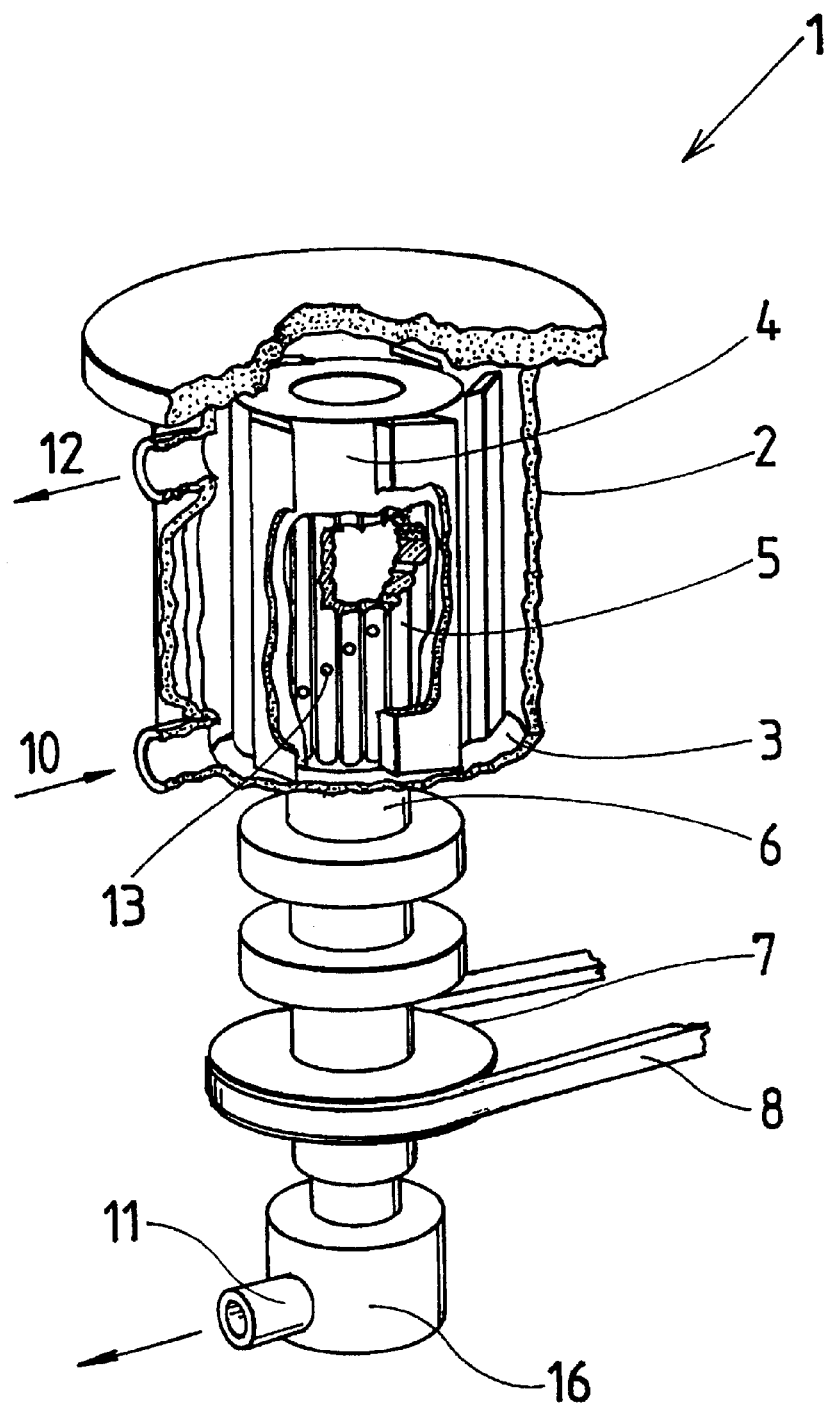
FIG. 2 is a cut-away side view of part of the apparatus of FIG. 1.

In the drawings, like reference numerals refer to like parts. Referring to FIG. 1, there is shown a filtration apparatus, generally indicated as 1, comprising a hollow body 2 forming a filtration chamber 3. A filtration membrane 4 is supported on a support member 5 which is centrally positioned for rotation within the chamber 3. The support member 5 is attached to a spindle 6 which is rotated by a drive mechanism comprising a pulley 7, belt 8 and motor 9.

A suspension of liquid and solid particles enters the chamber 3 through inlet port 10. A proportion of the liquid passes through membrane 4 and drains through apertures 13 in the support member 5 to a channel 14 in the spindle 6. The channel 14 drains to filtrate outlet 11. The remaining suspension, which has been concentrated by the removal of filtrate liquid, leaves the chamber through outlet port 12.

An arrangement of cup and cone bearings 15 support the spindle for rotation about a vertical axis. A rotary coupling 16 is used to make the connection between the channel 14 in the rotating spindle 6 and the stationary filtrate outlet 11.

Figure 3:
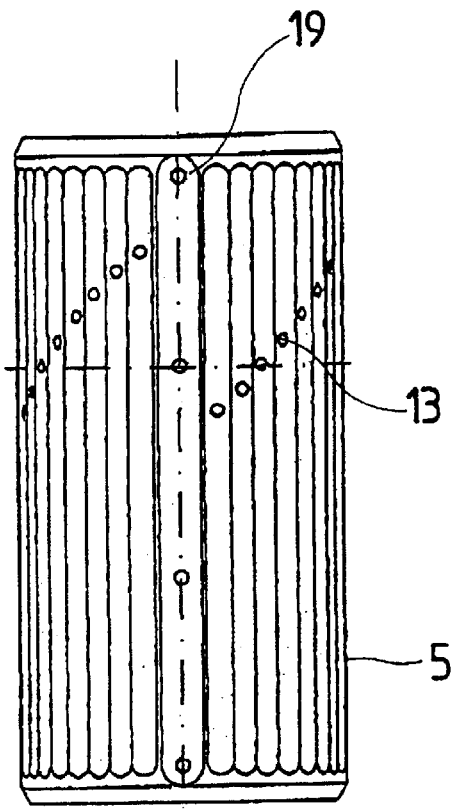
FIG. 3 is a detailed view of a support member.
Figure 5:
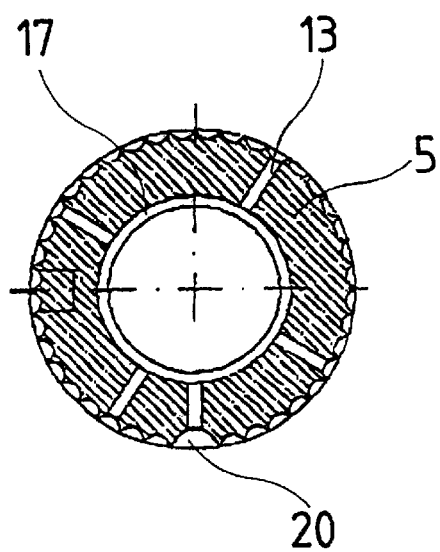
FIG. 5 is a sectional view through the line AA in FIG. 3.
Figure 4:
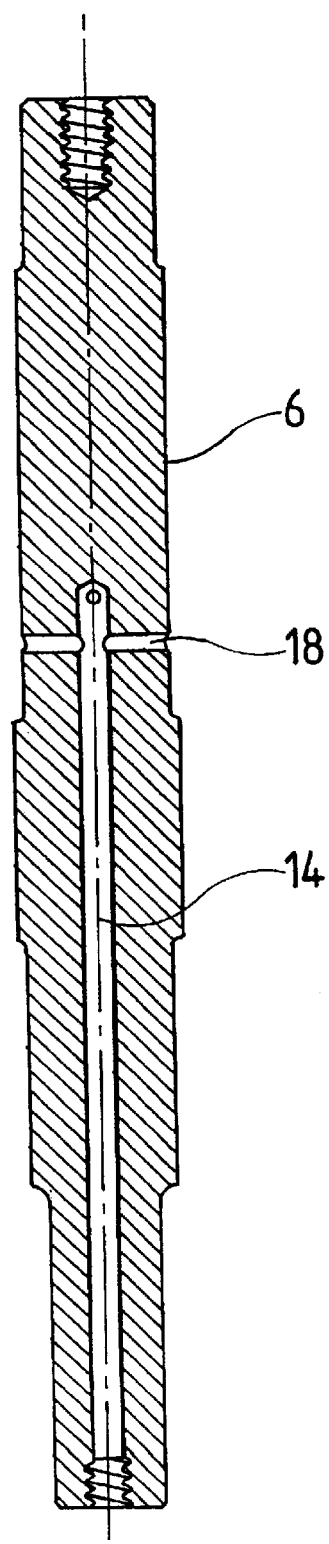
FIG. 4 is a cross-sectional view of a spindle.

A plurality of apertures 13 are provided in an upper portion of the support member 5, as shown in FIG. 3. The support member 5 is fitted to the spindle 6 so as to leave an annulus 17 through which the liquid flows to drain 18 connecting to the channel 14. The support member is shown as a stainless steel block in FIG. 3 and FIG. 5 but it will be appreciated that it is not limited to this structure. The purpose of the support member is to support the membrane and any structure that achieves this aim will suffice.

Figure 6:
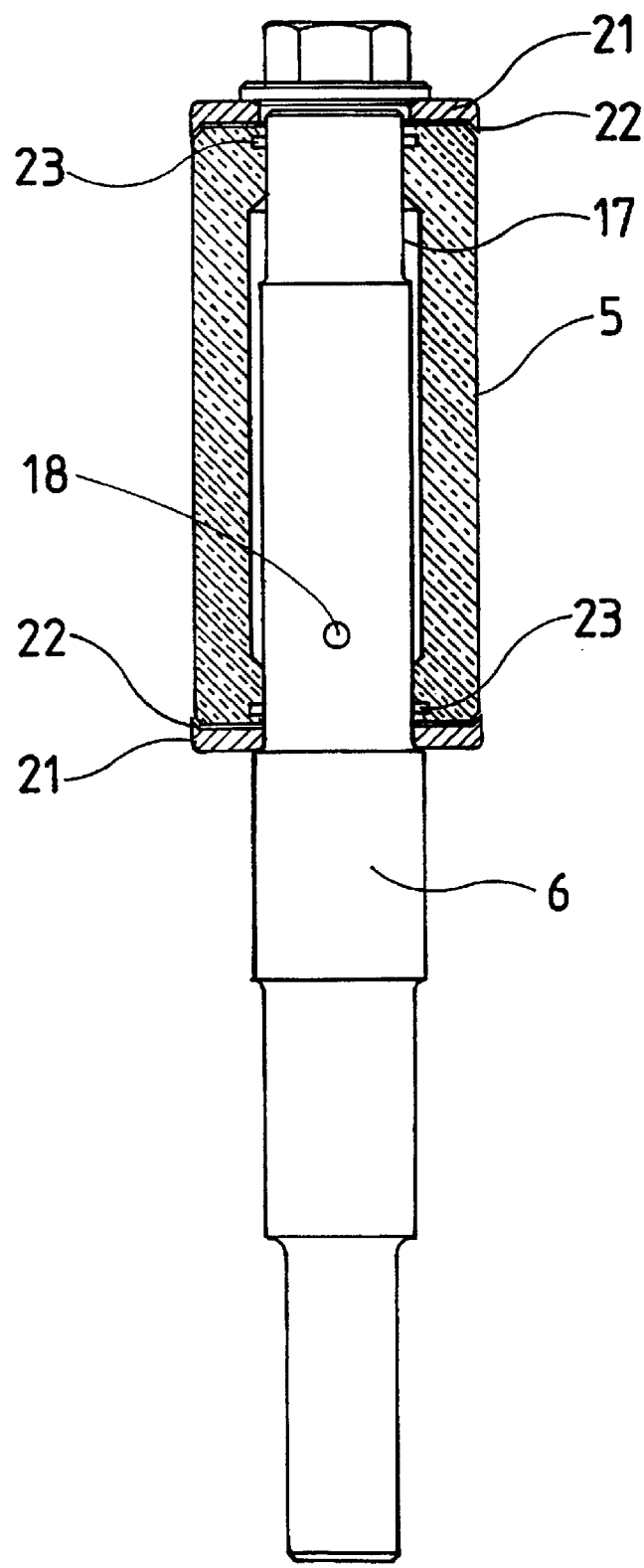
FIG. 6 is an assembled view of the support member and spindle.

The membrane 4 is wrapped about the support member 5 and held with an elongate clamp 19 that keys to a slot 20 in the support member 5. The outer surface of the support member 5 is profiled to securely hold the membrane 4. End clamps 21, shown in FIG. 6, have a projecting rim 22 that fits over the top and bottom of the membrane 4 to securely hold it in place on the support member 5. A liquid seal is formed between the support member 5 and spindle 6 by O rings 23.

It will be appreciated that this is only one method of clamping and sealing. Other methods of securing the membrane could be used.

Figure 7:
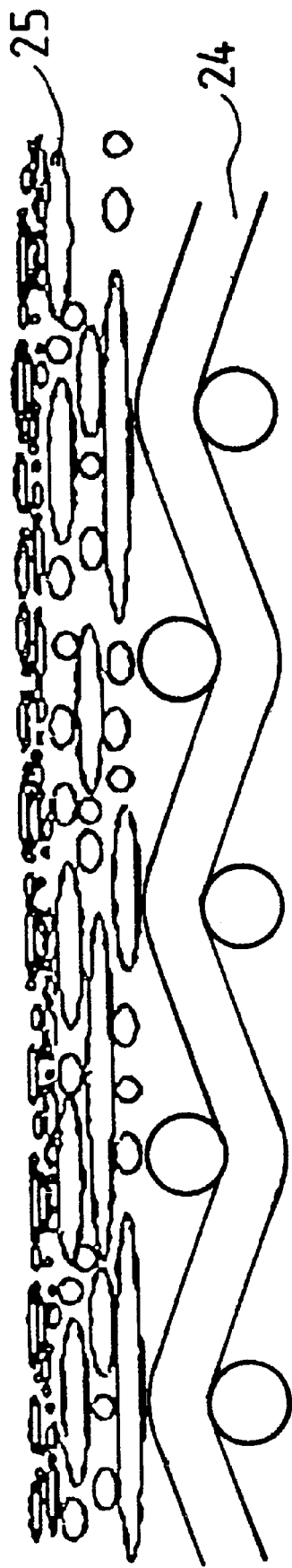
FIG. 7 is a schematic of a filter membrane.

An example of a suitable membrane 4 is shown in FIG. 7. The membrane 4 has a composite structure comprising a woven support mesh 24 coated with a number of layers of material 25 of progressively smaller pore size. Suitable membranes are generally referred to as cross-flow membranes. These membranes are charterised by having a pore size that diverges from the cross flow side (inlet side) to the filtrate side (outlet side).

The membrane can be constructed from a range of materials to provide desirable mechanical, chemical and performance properties. The materials may include a range of metals and their alloys (stainless steel, monel, nickel, hastelloy etc), plastics or ceramics. It will be appreciated that the membrane construction will vary depending on the materials and will differ from the specific construction described above. Pore sizes on the inlet side of the membrane may range from greater than 20 micron to less than 0.2 micron to suit specific envisaged applications. These sizes are currently achievable.

The suspension of liquid and solids flows over the surface of the membrane. Because the pore size diverges from the suspension side to the filtrate side the resistance to flow of the filtrate through the membrane is minimal. Filtrate flows through the membrane 4 and passes through apertures 13 in the support member to the channel 14 in the spindle 6 and out through the filtrate outlet 11. Because the suspension is flowing across the surface of the membrane rather than through the membrane there is a reduced tendency for blocking of the pores. If a particle is caught in the pores, the liquid flowing across the surface tends to dislodge the caught particle and entrain it to the outlet port.

Figure 8:
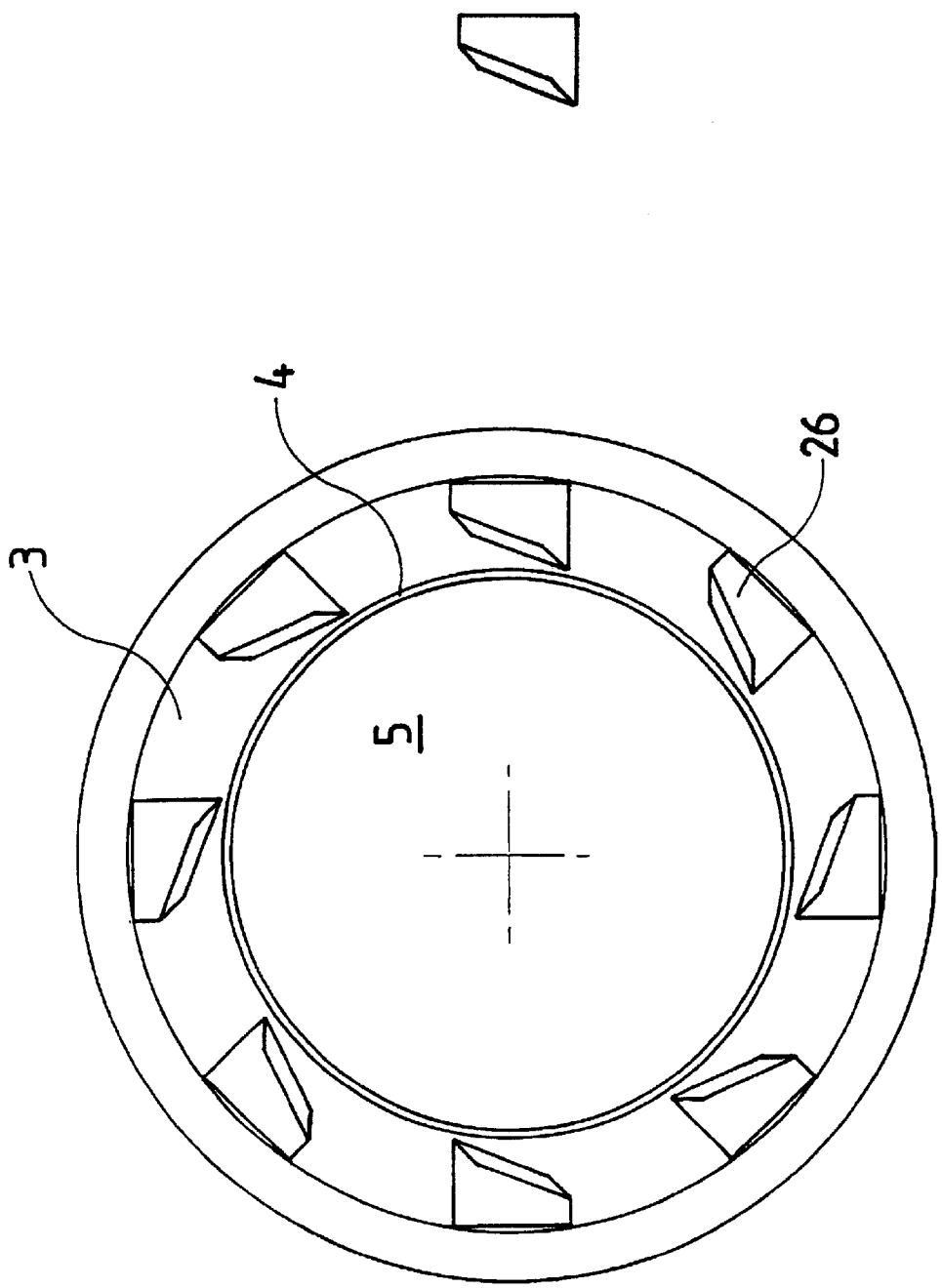
FIG. 8 is a sketch of the filtration chamber showing the addition of vanes.

The operation of the membrane is effected by rotation of the membrane in the chamber. Typically, the rotor turns with a surface speed in the range of 5–25 m/sec. The effectiveness of the membrane is enhanced if the flow through the chamber is turbulent. Turbulent flow occurs for a Reynolds number above about 1000. Reynolds number is calculated as a function of the speed of rotation of the filtration member 4 and the distance between the filtration member 4 and the hollow body 2. The rotor tends to cause laminar flow to occur in at least some regions of the filtration chamber 3. To maximize the turbulence and thereby increase efficiency a plurality of vanes 26 are mounted in the chamber 3. FIG. 8 shows eight vanes being employed to provide turbulence however more or less vanes can be used as required.

The vanes also tend to keep larger particles away from the membrane by deflecting them towards the outside and top of the chamber. As seen in FIG. 8, the surfaces of the vanes facing the membrane are slanted from bottom to top and away from the membrane towards the body. An impact between a large particle and the membrane rotating at 5–25 m/sec can generate sufficient impact to cause damage to the relatively fragile membranes.

The filtration apparatus is operated at a fairly constant flow and pressure. The inlet port may be fitted with a restrictor (not shown) to ensure a constant and controllable inlet pressure. The inventors have found that there will be an optimum flow rate and pressure setting for a given suspension. A typical inlet pressure is 100 kPa. Generally, the flow of liquid from the filtrate outlet increases as the inlet pressure is increased. If the flow of filtrate is seen to decrease it is generally due to blockage of the pores in the membrane. A reduction in inlet pressure will clear the blockage and return the filtrate flow to the maximum value. At this setting the apparatus can operate continuously with minimal maintenance.

Figure 9:
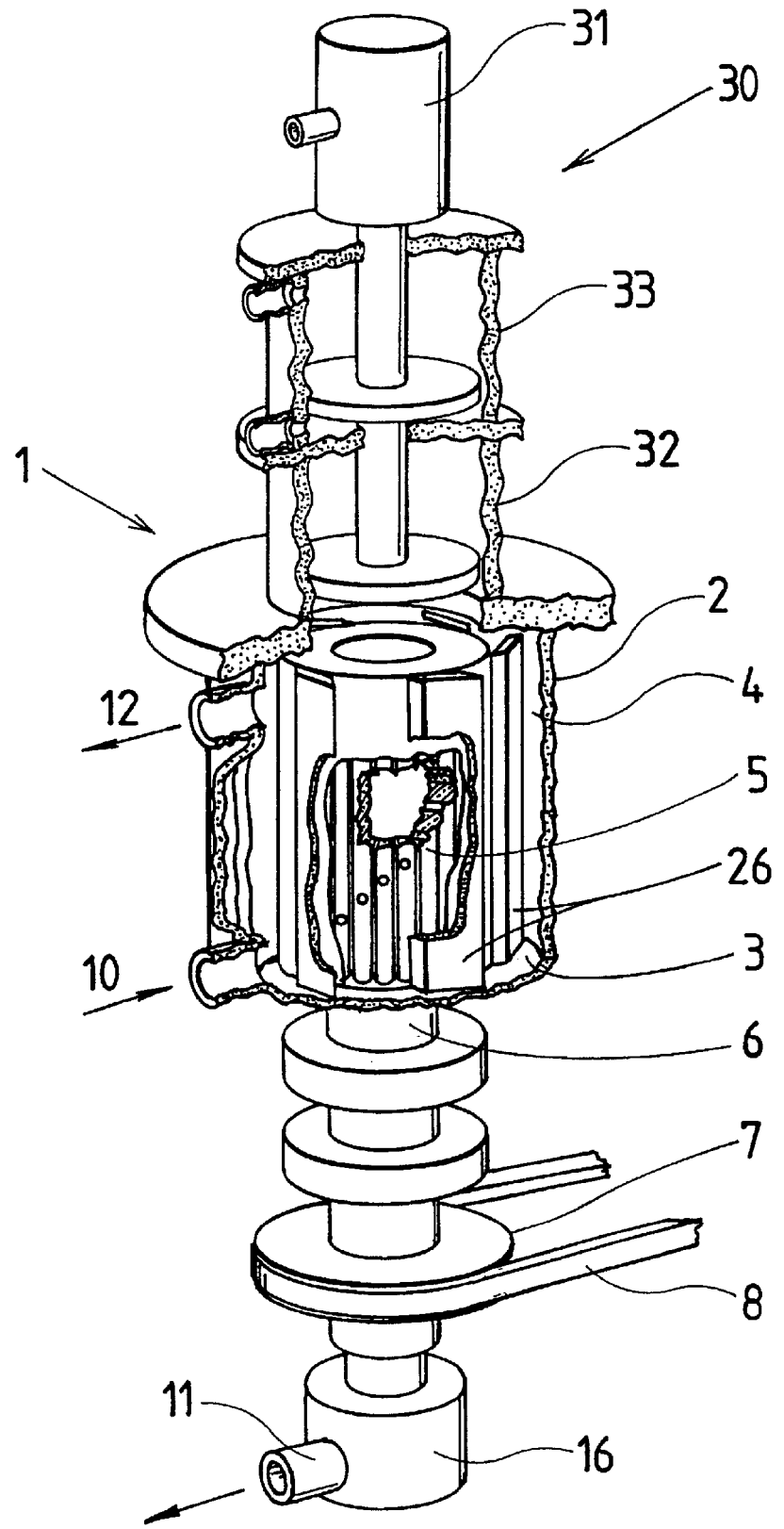
FIG. 9 is a sketch of the filtration apparatus of FIG. 1 with the addition of a cleaning head.

If reducing the pressure does not remove the blockage a pressure pulse can be applied by the cleaning head shown fitted to the filtration apparatus in FIG. 9. The cleaning head 30 is attached to the top of the filtration apparatus 1 and is communication with the filtration chamber 3. A pneumatic pulse operates the vibrator 31 and quickly raises the plunger 32 in cylinder 33 to apply a reduced pressure pulse to the filtration chamber 3. The sudden pressure drop reduces the force holding the particles in the pores and thereby clears the blockage with centrifugal force. The outlet port is fitted with a back flow prevention valve to prevent back flow of concentrated suspension during this operation. The plunger 32 is slowly returned to the starting position.

The apparatus can be fitted with a programmable logic controller (PLC) to control its operation. Initially, the apparatus runs through a start sequence with clean water. After a predetermined time, or upon pushing a button, the flow switches over to the liquid to be filtered. When filtering is completed the flow is switched back to clean water to flush all particulate matter from the machine. The cleaning head is also operated at this time, if required.

Figure 10:
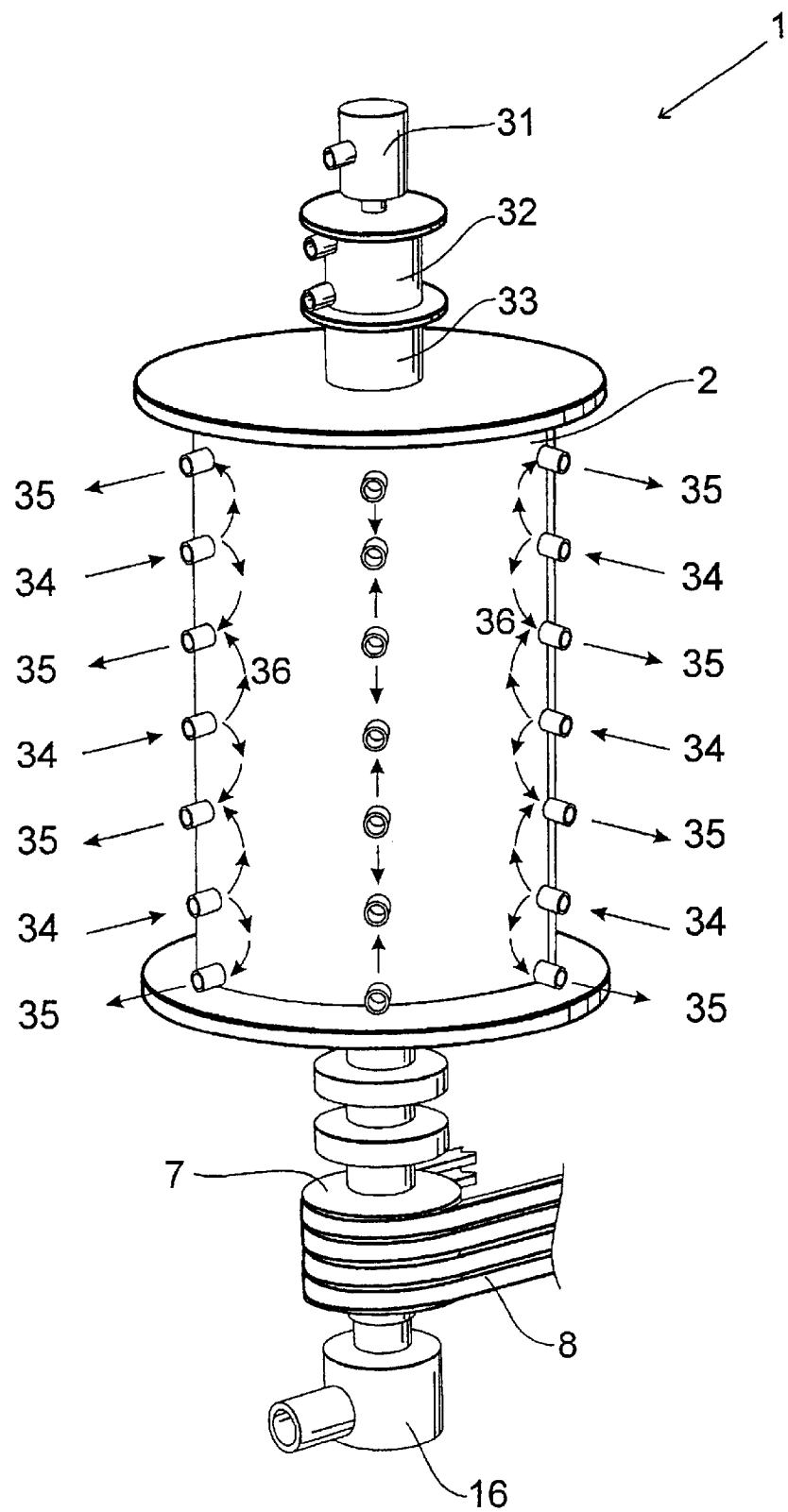
FIG. 10 is a sketch of a second embodiment of a filtration apparatus.

A second embodiment of the filtration apparatus is shown in FIG. 10. The apparatus of FIG. 10 is similar to the first embodiment except there are multiple inlet ports 34 and outlet ports 35. The multiple ports can provide more efficient operation of the filtration apparatus compared to the first embodiment. The majority of filtration will occur near the inlet port so in the first embodiment the lower part of the filter element will become blocked earlier than the upper part. The lower part therefore suffers greater wear than the upper part. In the embodiment of FIG. 10, the entire filter element is operating and therefore wears fairly evenly. The flow of liquid from the inlets to the outlets is shown by arrows 36. This leads to improved life and less wastage of usable filter membrane.

Figure 11:
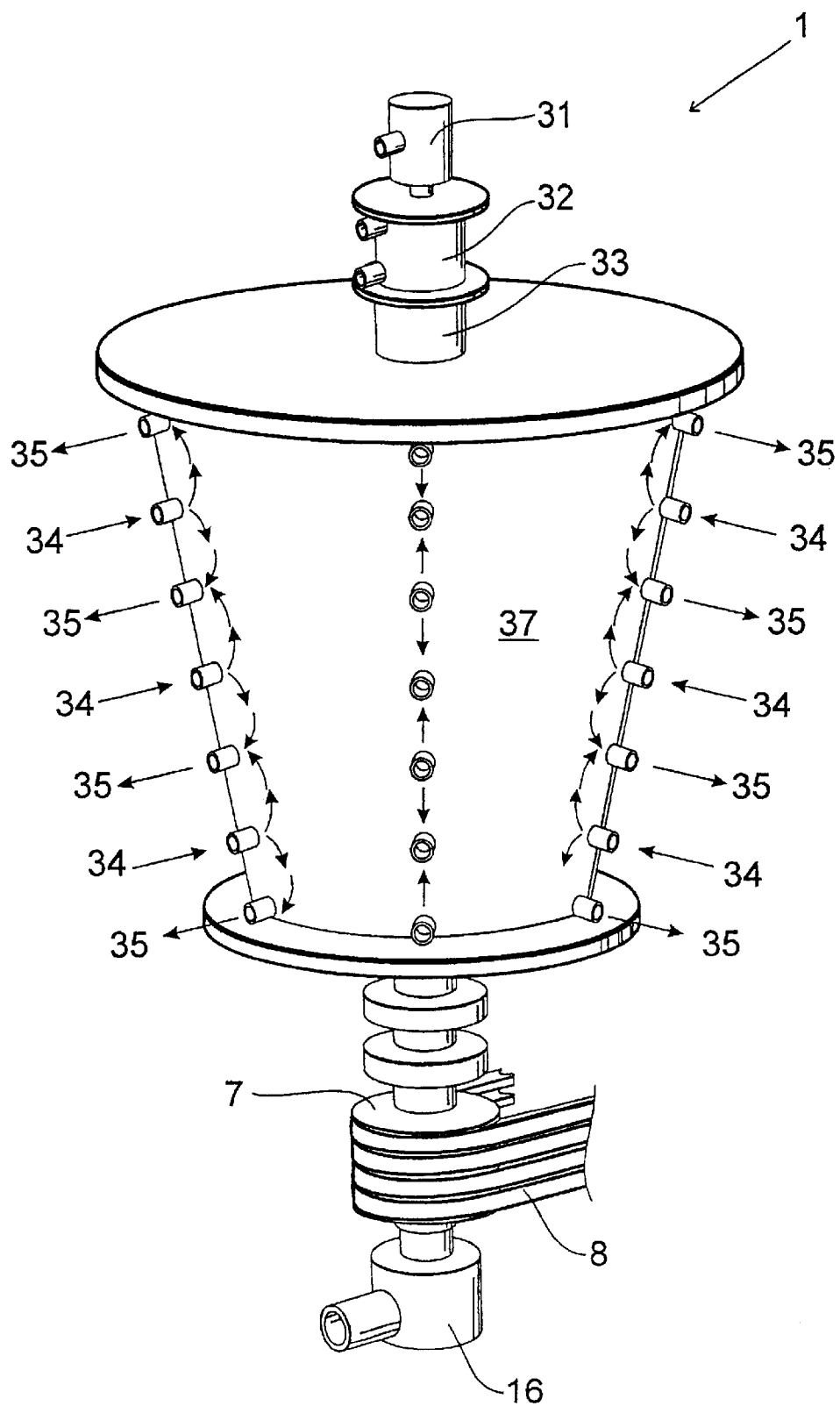
FIG. 11 is a sketch of a third embodiment of a filtration apparatus.

A third embodiment, shown in FIG. 11, differs from the first and second embodiments by employing a conical shaped support member (not visible) in a conical hollow body 37. The conical shape partly compensates for the increase in concentration as the liquid moves from an inlet port 34 to an outlet port 35. As will be appreciated, the removal of filtrate leads to an increased concentration of solid particles and hence a greater likelihood of blockage of the pores of the membrane. The tendency to blockage can be minimised by operating the apparatus with a higher cross-flow velocity. The conical shaped filter element produces an increasing surface velocity profile as the radius increases. Thus, as liquid moves up the cone from the inlet to the outlet it experiences a larger cross-flow velocity which compensates for the increased concentration of solids and thus minimises blockage. There will be an optimum spacing between an inlet port 34 and an adjacent outlet port 35 can be chosen to suit the specific situations.

The inventor has conducted flow tests in the described apparatus using a 250 mm×150 mm Bekaert NP210/01 membrane at 37° C. Table 1 shows the relation between flow rate and inlet pressure.

TABLE 1

| Inlet pressure | Flow rate |
|---|---|
| 55 kpa | 1.6 l/min |
| 70 kpa | 3.1 l/min |
| 85 kpa | 4.7 l/min |
| 90 kpa | 6.2 l/min |
| 115 kpa | 7.7 l/min |

Tests have also been conducted on sugar juice (30° Brix) and filtrate (5° Brix) from a rotary drum filter in a sugar mill. The filtrate was tested during a period of heavy rainfall during harvesting, when suspended solids loads reached 5000 mg/l.

An important measure of performance of the filtration apparatus is solids removal. The average solids removal for the filtrate from the rotary drum filter using the 2 $\mu$m membrane was 87%. Using the 0.6 $\mu$m membrane increased this figure to 91%. The solids removal was increased to 98% using the 2 $\mu$m membrane when the feed liquid was pretreated with a flocculating agent.

The inventor has also found that a 2 $\mu$m pore size filter removes 80% of starch from sugar juice. A finer filter, say 0.2 $\mu$m, will also remove dextran.

An important commercial consideration is that high specific flow rate (flux) is maintained. Average fluxes achieved on sugar juice for a range of membrane pore sizes are shown in Table 2.

TABLE 2

| Membrane | Flux |
|---|---|
| 12 $\mu$m | 250 l/min/m$^2$ |
| 2.0 $\mu$m | 74 l/min/m$^2$ |
| 0.6 $\mu$m | 21 l/min/m$^2$ |

As expected, the flux declines over time due to blockage of the pores of the membrane. Flux decline for a 0.6 $\mu$m membrane filtering sugar juice is shown in FIG. 12. At 21 minutes the cleaning process was activated.

The differences in fluxes evident in Table 2 and FIG. 12 are primarily due to the differences in porosity of the membranes. Secondary effects on flux include the differences in pore sizes of the membranes and the higher solids loading on the membrane due to the smaller pore sizes. The filtration apparatus established a repeatable pattern of operation wherein the flux was essentially restored through backwashing and pulsing triggered by the pressure drop. In other words, fouling of the membrane was shown to be reversible by the cleaning method described above.

Another important consideration is the down time of the apparatus. As mentioned above, the reverse flow cleaning cycle will remove blockages and allow continuous operation. The average cycle time, that is the time between cleaning cycles, was 21 minutes for the 0.6 $\mu$m membrane in the above application. Cycle times and flow rates will vary with the application.

The performance of the filtration apparatus can be considered in terms of the turbidity of the filtrate. If the filtration apparatus is successfully removing suspended solids there should be an improvement in turbidity. Table 3 shows the improvement in turbidity achieved by the filtration apparatus with three different membranes. The turbidity ratio is the ratio of turbidity of the concentrate compared to the filtrate. Improvement is the percentage improvement in turbidity of the filtrate compared to the unfiltered liquid.

TABLE 3

| Membrane | Turbidity Ratio | Improvement |
|---|---|---|
| 12 $\mu$m | 1.7 | — |
| 2.0 $\mu$m | 1.3 | 17% |
| 0.6 $\mu$m | 1.2 | 34% |

The filtration apparatus herein described is suitable for use in a diverse range of situations including removal of particles from car wash discharge water, removal of phosphates and suspended particles from sewerage and filtration of sugar juice to remove starch and dextran. A high filtrate flow rate is achieved with minimal blockage of filter pores.

Throughout the specification the aim has been to describe the preferred embodiments of the invention without limiting the invention to any one embodiment or specific collection of features.

What is claimed is:

1. A filtration apparatus comprising:
   a hollow body defining a chamber;
   a filter element concentrically housed in the chamber, said filter element including a support and a membrane attached to said support, said filter element having a cross flow side and a filtrate side;
   a space between said hollow body and said filter element;
   a drive mechanism coupled to said filter element and causing rotation thereof;
   at least one inlet port communicating with the chamber for ingress of suspension to be filtered and at least one outlet port communicating with the chamber for egress of concentrate;
   a turbulent flow path from the inlet port across the cross flow side of the filter element to the outlet port such that filtrate from the suspension passes through the filter element to the filtrate side and remaining concentrate passes out the outlet port; and
   a filtrate port communicating with the filtrate side of the filter element for removal of filtrate from the apparatus;
   wherein the space and rotation are selected to produce turbulent flow in the chamber, said membrane is formed as a composite structure having a number of layers, and a pore size of each layer increases from the cross flow side of the membrane to the filtrate side.

2. The filtration apparatus of claim 1 wherein the filter element and hollow body are conical.

3. The filtration apparatus of claim 1 wherein the filter element and hollow body are cylindrical.

4. The filtration apparatus of claim 1 further comprising multiple inlet ports and multiple outlet ports.

5. The filtration apparatus of claim 1 wherein the support has a plurality of apertures that allow passage of filtrate from the membrane to a channel leading to the filtrate ok port.

6. The filtration apparatus of claim 1 further comprising a spindle forming a part of the drive mechanism, said support being mounted upon said spindle.

7. The filtration apparatus of claim 6 wherein the drive mechanism further comprises a motor and a coupling between the motor and the spindle.

8. The filtration apparatus of claim 6 further comprising a central channel formed along a portion of the axis of a spindle for collection of the filtrate.

9. The filtration apparatus of claim 6 further comprising a rotary coupling between the filtrate port and the channel.

10. The filtration apparatus of claim 6 further comprising a central channel formed along a portion of the axis of the spindle for collection of the filtrate wherein an upper end of the channel is in fluid communication with the filtrate side of the filter element and the filtrate port communicates with a lower end.

11. A filtration apparatus comprising:
    a hollow body defining a chamber;
    a filter element concentrically housed in the chamber, said filter element consisting of a support and a membrane attached to said support, said filter element having a cross flow side and a filtrate side;
    a drive mechanism coupled to said filter element and causing rotation thereof;
    at least one inlet port communicating with the chamber for ingress of suspension to be filtered and at least one outlet port communicating with the chamber for egress of concentrate;
    a flow path from the inlet port across the cross flow side of the filter element to the outlet port such that filtrate from the suspension passes through the filter element to the filtrate side and remaining concentrate passes out the outlet port;
    a filtration port communicating with the filtrate side of the filter element for removal of filtrate from the apparatus; and
    a plurality of vanes projecting into the chamber from the hollow body to promote turbulent flow.

12. The filtration apparatus of claim 11 wherein the vanes are elongate projections aligned parallel to an axis of the support.

13. The filtration apparatus of claim 11 wherein a surface of the vanes towards the membrane is slanted from bottom to top and away from the membrane towards the body to direct flow towards the top and the outside of the chamber.

14. A filtration apparatus comprising:
    a hollow body defining a chamber;
    a filter element concentrically housed in the chamber, said filter element consisting of a support and a membrane attached to said support, said filter element having a cross flow side and a filtrate side;
    a drive mechanism coupled to said filter element and causing rotation thereof;
    at least one inlet port communicating with the chamber for ingress of suspension to be filtered and at least one outlet port communicating with the chamber for egress of concentrate;

a flow path from the inlet port across the cross flow side of the filter element to the outlet port such that filtrate from the suspension passes through the filter element to the filtrate side and remaining concentrate passes out the outlet port;

a filtration port communicating with the filtrate side of the filter element for removal of filtrate from the apparatus; and cleaning means for enhancing cleaning of the membrane by reducing a pressure in the chamber.

15. The filtration apparatus of claim 14 wherein the cleaning means comprises a pneumatic vibrator in pressure communication with the chamber for applying a reduced pressure pulse to the chamber.

* * * * *

UNITED STATES PATENT AND TRADEMARK OFFICE
CERTIFICATE OF CORRECTION

PATENT NO. : 6,416,665 B1
DATED : July 9, 2002
INVENTOR(S) : Kevin Douglas McGrath It is certified that error appears in the above-identified patent and that said Letters Patent is hereby corrected as shown below:

Title page,
Item [56], References Cited, FOREIGN PATENT DOCUMENTS,
after "WO 97/05938" delete "2/1990" and insert -- 2/1997 --.

Column 4,
Line 34, after "are" delete "charterised" and insert -- characterized --,
Line 61, after "chamber." delete "Typically,the" and insert -- Typically, the --.

Column 8,
Line 7, after "filtrate" delete "ok".

Signed and Sealed this

Seventh Day of February, 2006

JON W. DUDAS
*Director of the United States Patent and Trademark Office*